W. W. PRICE.
PACKING RING.
APPLICATION FILED JULY 17, 1911.
1,020,115.
Patented Mar. 12, 1912.
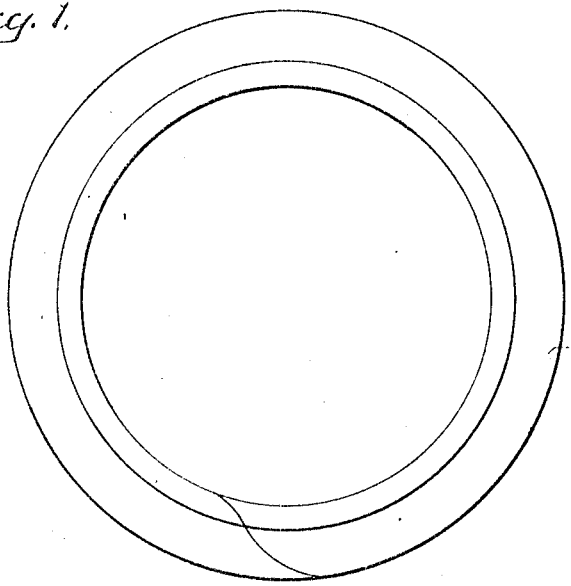
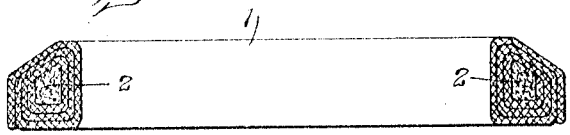
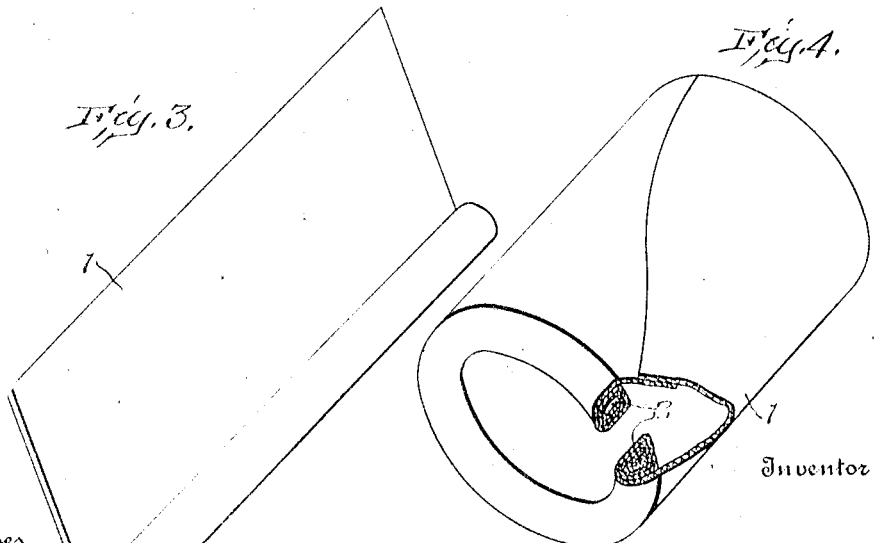
Inventor
William W. Price,

UNITED STATES PATENT OFFICE.

WILLIAM W. PRICE, OF DAYTON, OHIO.

PACKING-RING.

1,020,115.  Specification of Letters Patent.  Patented Mar. 12, 1912.

Application filed July 17, 1911. Serial No. 638,840.

*To all whom it may concern:*

Be it known that I, WILLIAM W. PRICE, a citizen of the United States, residing at Dayton, in the county of Montgomery and State of Ohio, have invented certain new and useful Improvements in Packing-Rings, of which the following is a specification, reference being had therein to the accompanying drawing.

This invention relates to packing rings and the method of producing the same.

Much difficulty has been experienced in providing a packing for the joints of pipe lines which would have the desired durability. Many packings have been tried, but, in almost every instance, it has been found that those materials which possessed the qualities necessary to form a tight joint would be so affected by the chemical action of the fluids carried by the pipes, such as gas, petroleum and its products, that their usefulness was soon destroyed and the repacking of the joints made necessary.

The object of this invention is to produce a packing ring, designed particularly for use in connection with pipe couplings, which will combine within itself the necessary qualities of strength, flexibility and non-adhesiveness and will not be injuriously affected by the chemical action of the fluid with which it comes in contact; and further to produce such a packing ring which will be simple in construction and which can be manufactured at a low cost.

In the accompanying drawings, Figure 1 is a plan view of a packing ring embodying my invention; Fig. 2 is a transverse, sectional view of such a ring; Fig. 3 is a detail view of the strip of material from which the ring is formed, showing the core applied thereto; and Fig. 4 is a perspective view, partially broken away, of the ring in an intermediate stage of construction.

In these drawings I have illustrated one form of packing ring produced by my method. This ring comprises a strip of flexible material 1 wrapped about a flexible core 2 to form an annular roll, which constitutes the packing ring. The flexible material from which the roll is formed may be of any suitable character which will not be injuriously affected by the action of the particular fluid with which it will come in contact. I have found that asbestos will best resist the chemical action of the fluids most commonly pumped through pipe lines, and, in order to secure the desired strength and flexibility, I prefer to employ a woven asbestos fabric. The flexible core also may be of any suitable material and, inasmuch as this core is not subjected to the action of the fluid to so great an extent as is the wrapping, it is not essential that it should have the same resisting qualities that are required for the wrapping. Nevertheless, I prefer to use asbestos for the core and a very satisfactory core can be formed from asbestos fiber. While the fabric may be wrapped about the core in any suitable manner I prefer to utilize a strip of fabric of a length approximately equal to the circumference of the ring and to wrap the fabric about the core in such a manner that each fold of the fabric will extend entirely about the ring, thereby providing a ring of absolutely uniform thickness and having a smooth exterior surface. The several folds of the fabric may be retained in their rolled positions by any means which will not affect the flexibility of the material and I employ for this purpose any of the well known flexible adhesive binders. While it is preferable that this binder should not be affected by the action of the fluid this is not important, as when the packing ring is once in position it will be prevented from unrolling by the pressure of the parts of the coupling. I also prefer to impregnate the material of the ring with a suitable lubricating agent which will not only prevent the material from adhering to the pipes and enable the same to slip easily onto and off of the pipe, but will also impart to the ring a greater degree of flexibility, enabling the same to more readily accommodate itself to the conformations of the pipe and the coupling. It is immaterial whether or not the ring is impregnated through and through with the lubricating agent. Very good satisfaction will usually be given if one or more of the outer wrappings are properly impregnated with the lubricating agent. Any suitable lubricating agent may be employed for this purpose. Preferably, the completed ring is immersed in a lubricating solution of a suitable character, very good results being attained by the use of ordinary lubricating oil. After the ring is completed and either before or after it has been treated with the lubricating solution, pressure is applied thereto, either by means of dies or otherwise, to give it the desired cross sectional shape.

The method by which I form the ring consists in providing a strip of flexible material, such as the asbestos fabric above referred to, of a length slightly greater than the circumference of the ring which is to be formed and of a width sufficient to give the desired number of folds or plies about the core. The ends of this strip are preferably cut on the bias, that is, at an acute angle to the longitudinal edges thereof. A core of flexible material, such as a small roll of asbestos fiber, is then applied to the strip of flexible material near one of the longitudinal edges thereof and the material folded about the core to retain the same in position. With the core in this position the material and the core are bent into circular form giving the flexible material a cylindrical shape and causing the end portions thereof to overlap, as shown in Fig. 4. Preferably, the ends of the core are also overlapped to further reinforce the joint. The remainder of the material is then wrapped about the core, preferably by rotating the partially completed ring about a circumferential axis. The overlapping edges of the fabric produce a long splice which will not materially affect the regular contour of the ring and which forms a very strong connection between the ends of the fabric.

After the ring has been completed it is immersed in a heated lubricating solution and allowed to remain in this solution long enough for the material to become properly impregnated therewith. After the ring has been removed from the solution it is subjected to pressure to impart to it the desired shape, this shape being such as to cause the ring to accommodate itself readily to the characteristics of the particular pipe coupling with which it is to be employed.

The ring thus produced is of the size and shape necessary for use with the particular pipe coupling with which it is to be employed and has a sufficient degree of flexibility to enable it to accommodate itself to all irregularities in the conformation of the pipe and pipe coupling. The ring has ample strength to resist all pressure which may be applied thereto and the material of the ring will not be affected by the chemical action of the fluids, and, consequently, neither its strength nor its flexibility will deteriorate with service. The woven asbestos fabric of which the outer portion of the ring is formed provides a flexible body having a considerable degree of resiliency. By treating this fabric with a lubricating agent it is rendered pliable and its resiliency is increased and retained. The treating of the fabric of the ring with a lubricating agent also serves to prevent the ring from becoming porous and allowing gas to leak through it. Further it effectually prevents the asbestos from adhering to the pipe and pipe coupling and the ring can be readily removed from the pipe even after it has been in use for a long period of time. It is apparent, therefore, that I have provided a packing ring having all the characteristics essential to forming a perfect joint for gas pipe lines, which is probably the most difficult joint to pack. It has the resiliency necessary to enable it to accommodate itself to the space between the parts of the coupling and the pipe and to effectually close this space and prevent the passage of gas through the same, thereby preventing all leakage at the joint. It is of a quality not affected by the chemical action of the gases or other products which may be conveyed through the pipe line nor does it deteriorate with age. Therefore, it will not become porous or leak even after it has been in service for a long period of time. Moreover, the material of the ring is of a strength sufficient to withstand any pressure to which it will be subjected in ordinary use. Further, the materials entering into the manufacture of the ring are inexpensive and the method of forming the ring is such that it can be produced at a very low cost, thereby coupling economy of manufacture with efficiency.

While I have shown one particular form of ring and have described the method by which this ring is made it will be understood that this ring is shown for the purpose of illustration only and that the detail construction of the ring can be varied and the method of making the same more or less altered without departing from the spirit of my invention.

Having thus fully described my invention, what I claim as new and desire to secure by Letters Patent, is:—

1. A packing comprising a soft core of fibrous material and an outer portion of woven asbestos fabric inclosing said core, whereby said core and said fabric combine to form a flexible body.

2. A packing ring comprising a core of fibrous material, and an outer portion of woven asbestos fabric inclosing said core and impregnated with a lubricating agent.

3. A packing ring comprising a core of fibrous material and an outer portion of woven asbestos fabric inclosing said core, said fabric being of a width substantially equal to the circumferential length of said ring.

4. A packing ring comprising a core of fibrous material and an outer portion of woven asbestos fabric wrapped about said core at approximately right angles to the circumferential axis of said ring.

5. A packing ring comprising a core of asbestos fiber, and an outer portion of woven asbestos fabric of a width substantially equal to the circumferential length of said core extending about the same at substantially right angles to said length of said core and having its outer plies impregnated with a lubricating agent.

6. A method of producing a packing ring consisting in bending a strip of flexible material into a substantially cylindrical shape with its edges overlapping, folding the material of said cylinder upon itself about an axis corresponding substantially to the circumference of said cylinder to form a ring and treating said ring with a lubricating agent.

7. A method of forming a packing ring consisting in forming a sheet of woven fabric into a cylinder with a flexible core of a diameter substantially the same as the diameter of said cylinder arranged at one end thereof and then folding the material of said cylinder about said core to form a ring.

8. A method of forming a packing ring consisting in forming a sheet of woven fabric into a cylinder with a flexible core of a diameter substantially the same as the diameter of said cylinder arranged at one end thereof, then folding the material of said cylinder about said core to form a ring and then treating said ring with a lubricating agent.

9. A method of forming a packing ring consisting in providing a strip of woven asbestos fabric having a core of asbestos fiber along one edge thereof, bending said strip and said core into substantially circular shape to form said strip into a cylinder, wrapping said material about said core to form an endless roll and immersing the endless roll thus formed in a heated lubricating solution.

In testimony whereof I affix my signature in presence of two witnesses.

WILLIAM W. PRICE.

Witnesses:
  O. B. TROUT,
  HARRIET L. HAMMAKER.